(12) United States Patent
Iizuka (10) Patent No.: US 7,446,801 B2
(45) Date of Patent: Nov. 4, 2008

(54) INFORMATION COLLECTION APPARATUS, INFORMATION COLLECTION SYSTEM, INFORMATION COLLECTION METHOD, PROGRAM, AND RECORDING MEDIUM

(75) Inventor: Yoshio Iizuka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 688 days.

(21) Appl. No.: 10/985,750

(22) Filed: Nov. 9, 2004

(65) Prior Publication Data

US 2005/0104973 A1    May 19, 2005

(30) Foreign Application Priority Data

Nov. 14, 2003   (JP)   ............................. 2003-385164

(51) Int. Cl.
*H04N 5/232*   (2006.01)
(52) U.S. Cl. .................. 348/211.4; 348/211.1; 348/143
(58) Field of Classification Search ................. 348/143, 348/153, 211.1, 94, 211.99–211.3, 211.11
See application file for complete search history.

(56) References Cited

U.S. PATENT DOCUMENTS

| 5,844,599 A | 12/1998 | Hildin |
| 2003/0032436 A1 | 2/2003 | Mikuni |
| 2004/0075547 A1* | 4/2004 | Vojtech et al. .............. 340/500 |
| 2004/0100562 A1* | 5/2004 | Ichikawa et al. ......... 348/211.1 |

FOREIGN PATENT DOCUMENTS

| JP | 09-065309 | 3/1997 |
| JP | 2003-163828 | 6/2003 |

* cited by examiner

*Primary Examiner*—Tuan V Ho
(74) *Attorney, Agent, or Firm*—Canon U.S.A. Inc I.P. Div (57) ABSTRACT

An information collection system including an information collection apparatus, a photographing apparatus and information acquisition apparatuses. The information collection apparatus collects information on the information acquisition apparatuses and the photographing apparatus. The information collection apparatus selects at least one of the information-acquisition apparatuses based on the collected information, and collects information about a predetermined position by communicating with the selected information-acquisition apparatus.

11 Claims, 7 Drawing Sheets

INFORMATION COLLECTION APPARATUS, INFORMATION COLLECTION SYSTEM, INFORMATION COLLECTION METHOD, PROGRAM, AND RECORDING MEDIUM

This application claims priority from Japanese Patent Application No. 2003-385164 filed Nov. 14, 2003, which is hereby incorporated by reference herein.

BACKGROUND OF THE INVENTION

1. Field of the Invention

The present invention relates to an information collection apparatus for collecting information data transmitted from a photographing apparatus and information acquisition apparatuses.

2. Description of the Related Art

Recently, sensing-network systems including a network and a plurality of sensors connected thereto are receiving attention. For example, Nikkei Electronics, Jul. 15, 2002, pp. 99-129, discloses several sensing-network systems. One of the example sensing-network systems disclosed in the above-described document includes numerous sensors distributed in a forest for collecting information on the forest, such as amount of oxygen generated, amount of $CO_2$ absorbed, temperature, humidity, and so forth. This sensing-network system can be used for early detection of a forest fire and $CO_2$-emission right transactions.

Further, sensor modules equipped with communication functions called Mote have been studied at the University of California, Berkeley. Although each Mote is relatively small, with each edge being about several centimeters long or less, Mote includes a physical sensor for measuring a predetermined physical quantity such as temperature, humidity, and so forth, a data-processing unit, and a wireless-communications unit are provided therein. Further, Mote has an ad-hoc communication function for performing wireless communications, so as to automatically determine or change a communication route.

Downsizing sensor modules allows for significant increased flexibility in determining position and methods for installing sensors, as shown in the above-described example. That is to say, it becomes possible to distribute the sensors in a predetermined environment and attach or set in predetermined unit of a building or other products.

On the other hand, known systems including an image-pickup device and a plurality of sensors were disclosed in Japanese Patent Laid-Open No. 8-18943, corresponding U.S. Pat. No. 5,844,599 (hereinafter referred to as Patent Document 1), Japanese Patent Laid-Open No. 2003-121195, corresponding U.S. patent application Ser. No. 2003032436 (hereinafter referred to as Patent Document 2), and so forth. According to Patent Document 1, a plurality of speech-activated transmitters is used for detecting the position of an effective speaker and the attitude of a video camera is controlled so as to point to the detected position. Each of the speech-activated transmitters has a microphone that can be used as a sensor. Therefore, where the microphones are used as sensors, it becomes possible to change a photographing method used for the video camera, based on information obtained from the sensors.

Patent Document 2 discloses a target-position search apparatus including a camera and a display unit. The target-position search apparatus receives the position information of a target via a center apparatus and measures the current position, photographing direction, and photographing angle of the camera. Then, the target-position search apparatus determines the position of the target in an image photographed by the camera, based on the measured information, and displays the target position on the photographing image.

According to the known sensing-network systems, all of the sensor modules are set to perform measurement and communications according to the same schedule. Therefore, it is impossible to select a predetermined sensor module and collect information about a predetermined position therefrom.

Although information about the predetermined position can be collected from each of the entire sensor modules, and unnecessary data can be selected and disposed of through an information collection apparatus, the above-described known systems have the following problems.

As a first problem, each of the sensor modules requires a relatively high-capacity battery mounted therein, so as to operate continuously over a long time period. As such, there is a limit to battery downsizing, and therefore it is difficult to downsize the entire sensor module. To solve the above-described problem, research has been conducted on reducing average power consumption of the sensor module by making the sensor module operate intermittently at regular intervals, optimizing the amount of power supplied to each element of the sensor module, reducing power consumption of each element, and so forth. However, an adequate level of power-consumption reduction has not yet been attained.

Also problematic with the above-described known systems is that all the sensor modules transmit the measurement data with equal frequency. Therefore, where multi-hop communications, in which data is relayed in a bucket-brigade fashion, are performed between the sensor modules, the amount of data passing through the sensor module may greatly increase, as the number of relay stations increases. Accordingly, the entire measurement data may not be transmitted at a predetermined data-transfer rate.

According to Patent Document 1, the photographing method is changed based on the information transmitted from the plurality of sensors. Therefore, the method for collecting information transmitted from the sensors cannot be changed based on photographing information indicating the photographing direction or the like.

The system disclosed in Patent Document 2 allows for changing the method for displaying the target on the display unit based on the position information of the target and the photographing information indicating the camera-photographing direction or the like that are transmitted via the center apparatus. That is to say, the above-described system does not allow selecting a predetermined information-acquisition apparatus from among a plurality of information-acquisition apparatuses so as to collect information therefrom and control operations of the information-acquisition apparatuses.

SUMMARY OF THE INVENTION

The present invention is directed to an information collection apparatus that can collect suitable information, based on photographing information, without increasing power consumption power and data rate, an information collection system incorporating the information collection apparatus, an information collection method, a program, and a recording medium.

According to one aspect of the present invention, an information collection apparatus that is capable of collecting information from a plurality of information-acquisition apparatuses and a photographing apparatus. The apparatus includes a communication unit facilitating communication with the plurality of information-acquisition apparatuses and the photographing apparatus; an information collection unit configured to selectively collect information including position information from each of the information-acquisition apparatuses, and position information and photographing parameter information from the photographing apparatus; and a selection unit configured to select at least one of the information-acquisition apparatuses based on the information collected by the information collection unit, and to collect predetermined position information about a predetermined position from the selected information-acquisition apparatus via the communication unit.

Further features and advantages of the present invention will become apparent from the following description of the embodiments (with reference to the attached drawings).

DESCRIPTION OF THE EMBODIMENTS

Embodiments of the present invention will now be described with reference to the attached drawings.

First Embodiment

Figure 1:
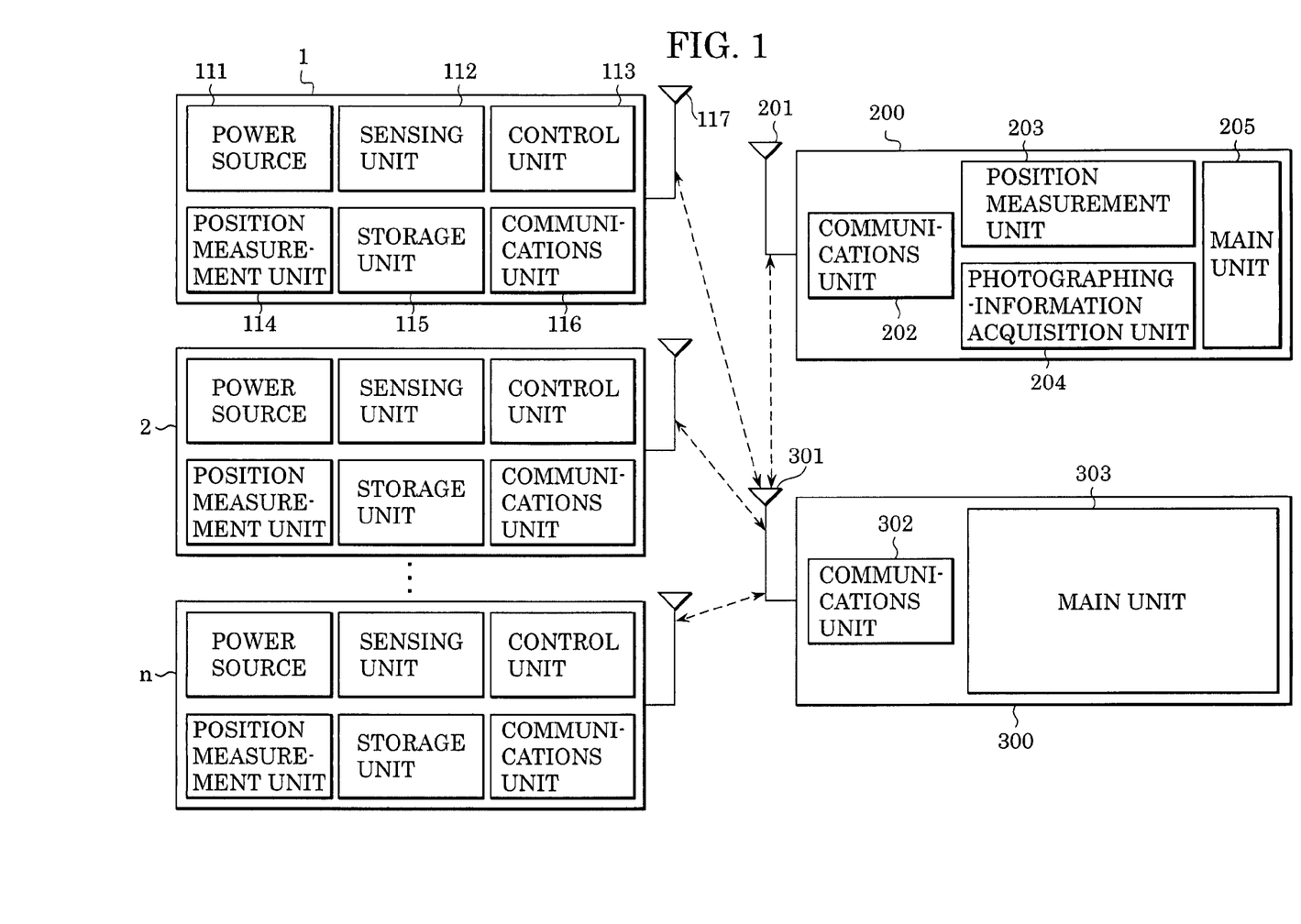
FIG. 1 is a block diagram of an information collection system according to a first embodiment of the present invention.

FIG. 1 is a block diagram illustrating an information collection system according to a first embodiment of the present invention. In this drawing, information-acquisition apparatuses 1 to n ($n \geq 2$) have the same configurations. Each of the information-acquisition apparatuses 1 to n has a power source 111, a sensing unit 112, a control unit 113, a position measurement unit 114, a storage unit 115, a communications unit 116, an antenna 117, and so forth.

The power source 111 can be, for example, a battery or a generator, or a combination of the battery and the generator. Where the battery is used, a disposable primary battery, a rechargeable secondary battery, or a capacitor/super capacitor can be used, for example. Where the generator is used, a solar panel using optoelectronic effects of an optoelectronic element, a wind-power generator using electromagnetic induction of a coil, a thermoelectric generator (a temperature-difference generator) using the Seebeck effect of a thermoelectric element, and a piezoelectric generator using piezoelectric effects of a piezoelectric element can be used, for example. The power source 111 can be any combination of the above as long as the selected generator can be scaled down in size.

The sensing unit 112 can be, for example, a physical sensor, a chemical sensor, and a biosensor. Each of the above-described sensors can be scaled down in size by using semiconductor-microfabrication technology, or micro-electro-mechanical systems (MEMS) technology, for example. There are many sensors that can be significantly downsized and used for the physical sensor, including an acceleration sensor, an angular-velocity sensor, an oscillation sensor, an azimuth sensor, a temperature sensor, a humidity sensor, a pressure sensor, a microphone, an imaging sensor, and so forth.

The control unit 113 can be, for example, a microprocessor such as an IC, an LSI, a DSP, and so forth. Although a general-purpose processor can be used as the control unit 113, a custom processor can also be used, as required. The control unit 113 performs the following processing procedures, based on program code stored in the storage unit 115. That is to say, the control unit 113 generates transmission data from measurement data obtained by the sensing unit 112, notifies the communications unit 116 of a method for transmitting the transmission data, transmission timing, and so forth, changes the control method by analyzing reception data transmitted from the communications unit 116, etc.

The position measurement unit 114 can be, for example, a global-positioning-system (GPS) unit. Where a photographing subject is within indoors or at a predetermined place with poor skyward visibility, it is often difficult for a GPS unit to measure the position of the photographing subject. In this case, radio-wave transmission sources may be provided at a plurality of predetermined positions, in place of a GPS satellite. Subsequently, it becomes possible to perform triangulation in much the way that the GPS unit does.

Where the information-acquisition apparatuses 1 to n are provided at predetermined positions, the position measurement unit 114 becomes unnecessary. In this case, information about the positions of the information-acquisition apparatuses 1 to n is prestored in an information collection apparatus 300, which will be described later.

The storage unit 115 can be, for example, a ROM, a RAM, and so forth. Program code or fixed data provided to the control unit 113 can be stored in the ROM. Temporary data transmitted from the sensing unit 112, the position measurement unit 114, and the communications unit 116 can be stored in the RAM.

The communications unit 116 performs D/A conversion and modulation for transmission data, and demodulation and A/D conversion for reception data. Where there is a need to perform data compression/decompression, encoding/decoding, and so forth, either the control unit 113 or the communications unit 116 can be used.

Since wireless communications are performed between apparatuses by using radio waves in this embodiment, an antenna 117 is required. Where the wireless communications are performed by using optical signals, a light-emission unit and a light-reception unit are used in place of the antenna 117. Where the wireless communications are performed by using sound waves, or ultrasound waves, an oscillation unit and an oscillation-reception unit are used in place of the antenna 117.

Each of the above-described information-acquisition apparatuses 1 to n may be downsized as much as possible, so as to be installed, attached, or mounted in various places. On the other hand, a photographing apparatus 200 and the information collection apparatus 300 that will be described later are not attached or mounted in general. Therefore, the photographing apparatus 200 and the information collection apparatus 300 need not to be downsized as much as the information acquisition apparatuses 1 to n.

The photographing apparatus 200 includes an antenna 201, a communications unit 202, a position measurement unit 203, a photographing-information acquisition unit 204, and a main unit 205. The antenna 201 has the same function as that of the antenna 117 of each of the information-acquisition apparatuses 1 to n. Although the communications unit 202 has the same function as that of the communications unit 116 of each of the information-acquisition apparatuses 1 to n, the communication method and the communication parameters of the communications unit 202 may differ from those of the communications unit 116.

The position measurement unit 203 has the same function as that of the position measurement unit 114 of each of the information-acquisition apparatuses 1 to n. Where the photographing apparatus 200 is installed at a predetermined position, the position measurement unit 203 becomes unnecessary. In this case, the position information of the photographing apparatus 200 is stored in the information collection apparatus 300 in advance.

The photographing-information acquisition unit 204 measures the photographing direction (orientation θ and elevation angle φ) and focus distance r. The focus distance r can be easily calculated from the amount of control over a focus system of the photographing apparatus 200.

Where the photographing apparatus 200 is installed in predetermined orientation θ0 and at predetermined elevation angle φ0, the photographing direction (orientation θ and elevation angle φ) can be calculated through Equations (1) and (2) by measuring the displacement amount (orientation θΔ and elevation angle φΔ) of the photographing direction of the photographing apparatus 200.

$$\theta = \theta 0 + \theta \Delta \quad \text{Equation (1)}$$

$$\phi = \phi 0 + \phi \Delta \quad \text{Equation (2)}$$

The displacement amount of the photographing direction of the photographing apparatus 200 can be easily measured, since it can be directly calculated from the amount of control over a rotation system (not shown) of the photographing apparatus 200.

Where the photographing apparatus 200 is installed in a movable manner, the absolute value of the photographing direction (orientation θ and elevation angle φ) must be calculated. In this case, orientation θ can be measured by using a geomagnetic sensor and elevation angle φ can be calculated by using the acceleration sensor that can measure gravitational acceleration. Since the main unit 205 has the same configuration as that of a main unit of a known photographing apparatus, such as a digital camera, a digital video camera, and so forth, the description thereof is omitted here.

The information collection apparatus 300 has an antenna 301, a communications unit 302, and a main unit 303. Since the antenna 301 transmits radio waves to the information-acquisition apparatuses 1 to n and the photographing apparatus 200, and receives radio waves therefrom, the antenna 301 may be more efficient than the above-described antennas. Since it is not necessary for the information collection apparatus 300 to be small, as has been described, the antenna 301 is not necessarily small. That is to say, the antenna 301 can be formed in any size and shape suitable for achieving high efficiency. The antenna 301 can be a directional antenna, where the information-acquisition apparatuses 1 to n and the photographing apparatus 200 are installed at predetermined positions.

To communicate with the information-acquisition apparatuses 1 to n and the photographing apparatus 200, the communications unit 302 is compliant with the communication systems and communication parameters of the above-described apparatuses. All the apparatuses, including the information collection apparatus 300, can use the same communication method and the value of unit of the communication parameters used by each of the information-acquisition apparatuses 1 to n is different from that of unit of the communication parameters used by the photographing apparatus 200.

Figure 8:
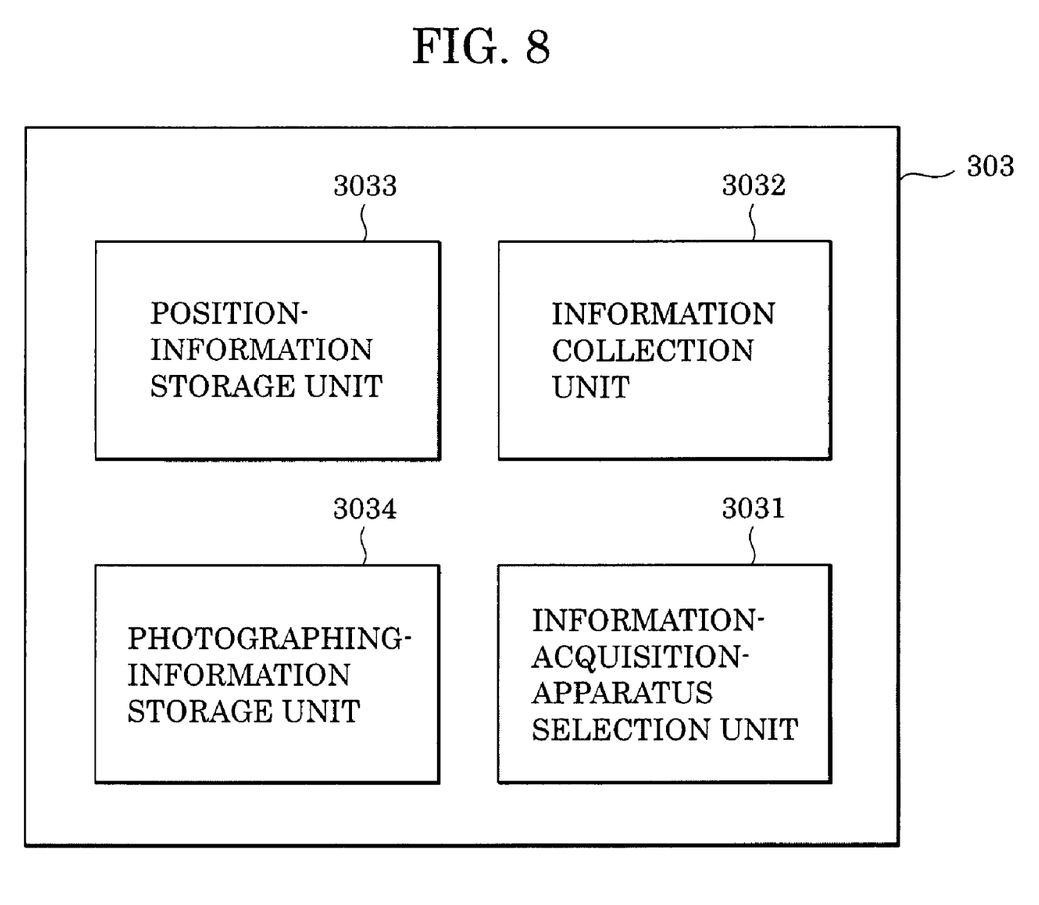
FIG. 8 is a block diagram of a main body of the information collection apparatus.

The main unit 303 can have the same configuration as that of a computer system including a CPU, a ROM, a RAM, and so forth, as is the case with a main unit of a known information processing apparatus such as a PC, a PDA, and so forth. As shown in FIG. 8, the main unit 303 of this embodiment includes an information-acquisition-apparatus selection unit 3031, an information collection unit 3032, a position-information storage unit 3033, a photographing-information storage unit 3034, and so forth.

Figure 3:
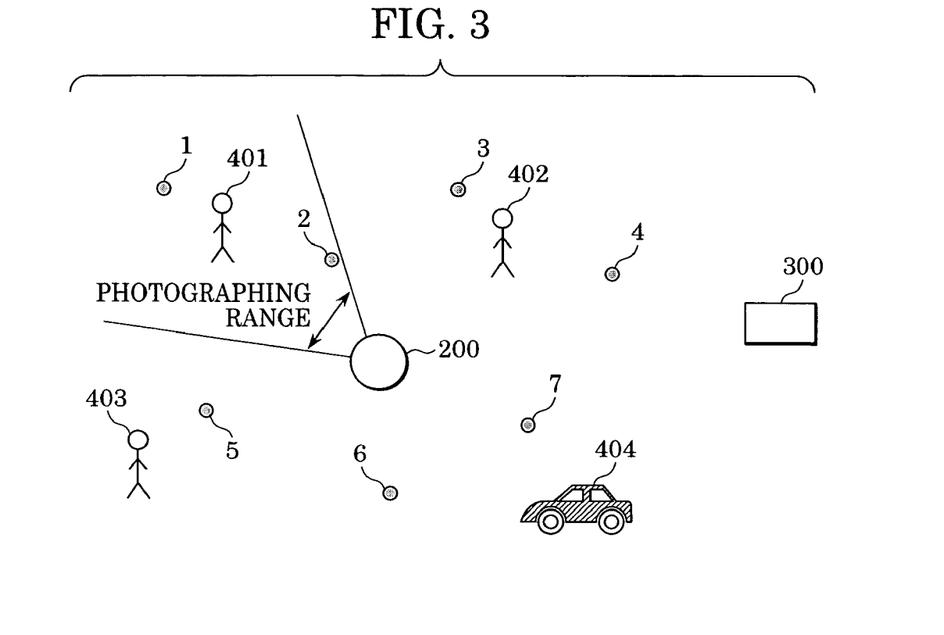
FIG. 3 is a drawing illustrating an example position relationship between information-acquisition apparatuses, a photographing apparatus, and an information collection apparatus according to either the first embodiment or the second embodiment, and a photographing subject.

FIG. 3 is a drawing showing an example relationship between positions of the information-acquisition apparatuses 1 to 7, the photographing apparatus 200, the information collection apparatus 300, and photographing subjects 401 to 404. In this drawing, the photographing apparatus 200 is pointed at the photographing subject 401. The information collection apparatus 300 selects the information-acquisition apparatus 1 by a method that will be described below and collects information obtained only from the information-acquisition apparatus 1.

Figure 4:
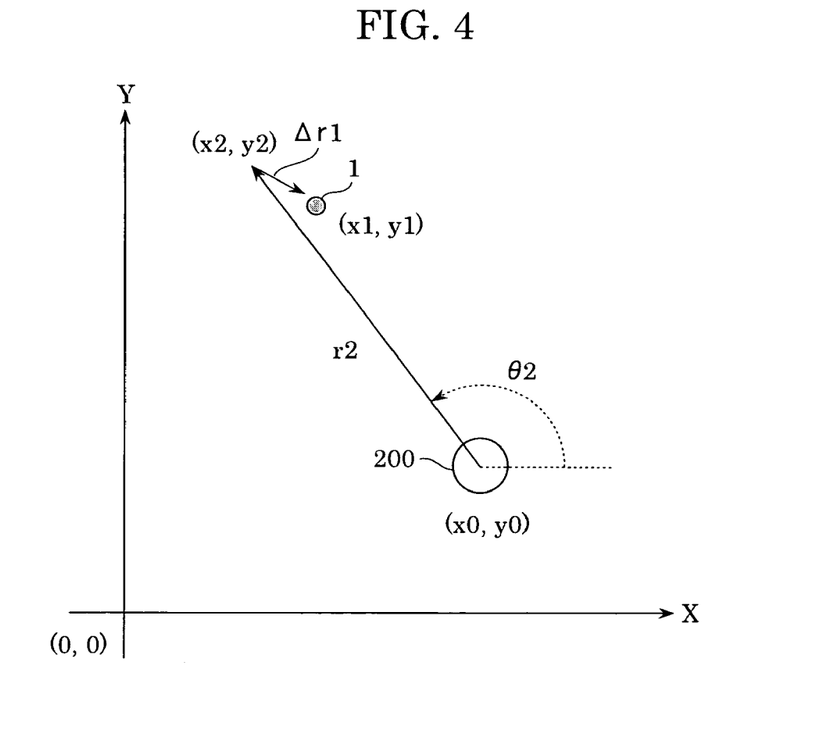
FIG. 4 is a drawing illustrating how the information collection apparatus selects the information-acquisition apparatus according to the relationship shown in FIG. 3.

FIG. 4 illustrates how the information collection apparatus 300 selects the information-acquisition apparatus 1 according to the relationship shown in FIG. 3. In this drawing, it is arranged that the information collection apparatus 300 (not shown) receives the position information of each of the information-acquisition apparatuses 1 to 7 and the photographing apparatus 200 in advance or stores the position information in advance, as predetermined position information. Further, it is arranged that information about the photographing direction (orientation θ and elevation angle φ) and the focus distance r of the photographing apparatus 200 is transmitted to the information collection apparatus 300 (not shown) in advance. This drawing does not show angle φ and altitude z for the sake of simplification.

In this drawing, a reference position is determined to be the origin point (0, 0, and 0) on a rectangular coordinate system (x, y, and z). Although the x-axis is pointed to east, the y-axis is pointed to north, and the z-axis is pointed skyward in this embodiment, each of the axes can be randomly selected for any direction. The photographing apparatus 200 is provided at a position (x0, y0, and z0) on the rectangular coordinate system and the information-acquisition apparatus 1 is provided at a position (x1, y1, and z1) thereon.

A predetermined position on a polar coordinate system (θ, φ, and r), wherein the photographing apparatus 200 is determined to be the origin point thereof, can be indicated, based on the photographing direction (orientation θ and elevation angle φ) and focus distance r of the photographing apparatus 200. Where the focus point of the photographing apparatus 200 is at a predetermined position (θ2, φ2, and r2) on the polar coordinate system, a predetermined position (x2, y2, and z2)

on the rectangular coordinate system can be calculated through Equations (3), (4), and (5).

$$x2 = r*\cos(\theta 2)*\cos(\phi 2) + x0 \quad \text{Equation (3)}$$

$$y2 = r*\sin(\theta 2)*\cos(\phi 2) + y0 \quad \text{Equation (4)}$$

$$z2 = r*\sin(\phi 2) + z0 \quad \text{Equation (5)}$$

Then, the information collection apparatus 300 calculates linear distance Δrn between the focus point (x2, y2, and z2) of the photographing apparatus 200 and the position (xn, yn, and zn) of the information-acquisition apparatus n (where n=1 to 7) on the rectangular coordinate system according to Equation (6).

[Expression 1]

$$\Delta rn = \sqrt{(x2 - xn)^2 + (y2 - yn)^2 + (z2 - zn)^2} \quad \text{Equation (6)}$$

The value of n shown in Equation (6) is determined to be 1 to 7 and linear distance Δrn is calculated for each of the values. Where the calculation results are compared to one another, the information-acquisition apparatus 1 is selected, as an information-acquisition apparatus corresponding to the smallest calculation result, that is, an information-acquisition apparatus provided at the shortest linear distance from the focus point (x2, y2, and z2). Thus, the information collection apparatus 300 can select an information-acquisition apparatus provided at the shortest distance from the focus point at a predetermined position in the photographing direction of the photographing apparatus 200.

Where the information-acquisition apparatuses 1 to 7 are distributed at a predetermined density that is high to a predetermined extent, the information-acquisition apparatuses 1 to 7 exist near the focus point. Therefore, it may be arranged that threshold value ΔR is determined for linear distance Δrn. Subsequently, it becomes possible to select every information-acquisition apparatus, where the value of linear distance Δrn between the information-acquisition apparatus and the focus point is smaller than threshold value ΔR. Otherwise, a predetermined number of or fewer information-acquisition apparatuses may be selected from among the information-acquisition apparatuses 1 to 7.

Figure 5:
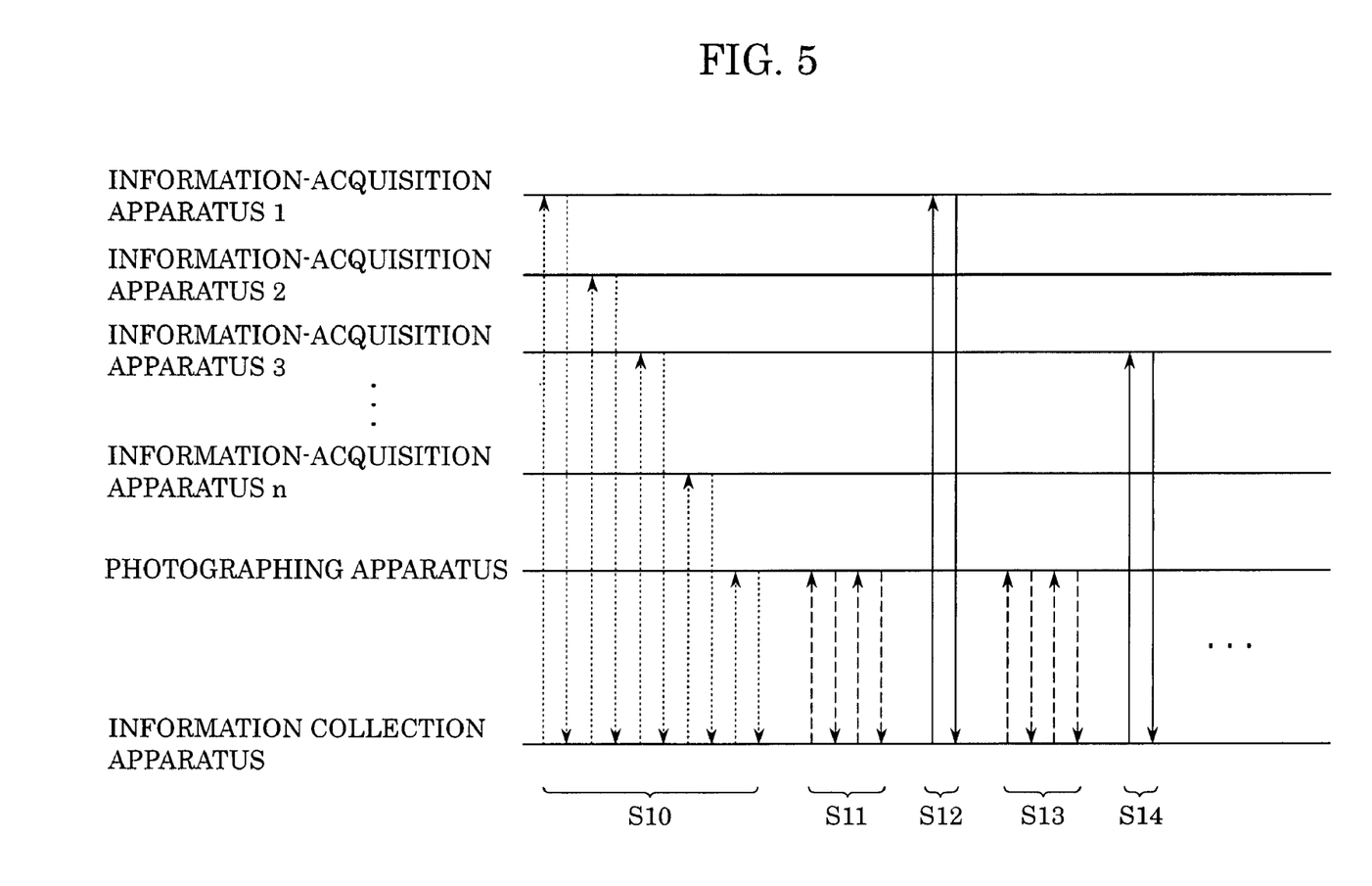
FIG. 5 is a sequence chart illustrating a first series of steps performed by the information collection apparatus according to the first embodiment for collecting information from each of the information-acquisition apparatuses and the photographing apparatus.

FIG. 5 is a sequence chart illustrating first procedural steps performed by the information collection apparatus 300 for collecting information from the information-acquisition apparatuses 1 to n and the photographing apparatus 200. In this drawing, the sequence flows from left to right.

Sequence S10 shows procedural steps performed by the information collection apparatus 300 for obtaining position information from each of the information-acquisition apparatuses 1 to n and the photographing apparatus 200. However, in the case in which the position information is known in advance and stored in the information collection apparatus 300, sequence S10 is unnecessary. In sequence S10, the information collection apparatus 300 requests the position information from the information-acquisition apparatuses 1 to n and the photographing apparatus 200 in sequence, and obtains the position information of each of the apparatuses by receiving an answer signal transmitted from each of the apparatuses.

Next, in sequence S11, the information collection apparatus 300 obtains photographing images and the photographing information (orientation θ, elevation angle φ, and focus distance r) transmitted from the photographing apparatus 200 in consecutive manner. Here, the information collection apparatus 300 has an image display and presents the obtained images to a user. The user can remotely control the photographing apparatus 200 via the information collection apparatus 300.

Where the user obtains the photographing image of a predetermined place while he/she remotely operates the photographing apparatus 200 and watches the obtained photographing images, the user issues an instruction to obtain a predetermined information about the place. Upon receiving the instruction transmitted from the user, the information collection apparatus 300 automatically selects the information-acquisition apparatus 1 near the center of the photographing image according to the method described with reference to FIG. 4.

Next, in sequence S12, the information collection apparatus 300 obtains the predetermined information transmitted from the information-acquisition apparatus 1. Here, the predetermined information indicates information transmitted from the sensing unit 112 of each of the information-acquisition apparatuses 1 to n, or information obtained by processing the information transmitted from the sensing unit 112. Then, the information collection apparatus 300 correlates the photographing image (the photographing image corresponding to the user instruction) obtained in sequence S11 with the predetermined information obtained in sequence S12. Further, the information collection apparatus 300 stores and/or presents the photographing image and the predetermined information to the user.

Then, the same operations as those in sequences S11 and S12 are repeated in sequences S13 and S14, so that the photographing image corresponding to the user instruction is correlated with the predetermined information obtained from the information-acquisition apparatus (for example, the information-acquisition apparatus 3) near the center of the photographing image. Then, the photographing image and the predetermined information are stored and/or presented to the user.

For reducing the average power consumption of the information-acquisition apparatuses 1 to n, each of the information-acquisition apparatuses 1 to n may be controlled, so as to be in the sleep state in normal times. In this case, each of the information-acquisition apparatuses may be controlled so that the power source 111 distributes power only to the control unit 113 or unit thereof and the communications unit 116 or unit thereof. Subsequently, only the reception function of the information-acquisition apparatus works at all times. Since the power source 111 does not distribute power to the other units of the information-acquisition apparatus in the sleep state, the power consumption of the information-acquisition apparatus is significantly reduced.

Where at least one of the information-acquisition apparatuses 1 to n in the sleep state receives an effective signal from the information collection apparatus 300, the information-acquisition apparatus enters the wake-up state (the state where power is distributed to the entire units) under the control of the control unit 113. Where a predetermined operation is terminated, a predetermined period of time elapses, or a predetermined signal (an information-stop request signal) is transmitted from the information collection apparatus 300, the information collection apparatus 300 goes back to the sleep state under the control of the control unit 113. According to the above-described control method, the average wake-up time of each of the information-acquisition apparatuses 1 to n is significantly reduced. Subsequently, the average power consumption of the information-acquisition apparatuses 1 to n is greatly reduced.

The information collection system of this embodiment can be used according to a predetermined method different from the above-described method. For example, where the photographing apparatus 200 has an automatic oscillation function and photographs a predetermined subject while oscillating in a predetermined cycle, there is no need for the information collection apparatus 300 to transmit an inquiry signal and the user instruction to the photographing apparatus 200. In this case, it needs to be arranged that the photographing apparatus 200 transmits the photographing image and the photographing information to the information collection apparatus 300 at regular time intervals. Upon receiving the photographing image and the photographing information, the information collection apparatus 300 automatically selects a predetermined information-acquisition apparatus near the center of the photographing image from among the information-acquisition apparatuses 1 to n by the method described with reference to FIG. 4. Then, the information collection apparatus 300 obtains predetermined information from the selected information-acquisition apparatus. Then, the information collection apparatus 300 correlates the photographing image with the predetermined information and stores and/or presents the photographing image and the predetermined information to the user.

Where a dust sensor (a sensor for measuring a suspended particle of a predetermined size), a chemical sensor that reacts with a predetermined chemical substance, or a biosensor is used, as the sensing unit 112 and where great number of the information-acquisition apparatuses 1 to n (n>>1) are installed or distributed in a predetermined environment (the atmosphere, a river, the soil, the ocean, and so forth), the information collection system of this embodiment can be used, as a system for monitoring environmental pollution.

In the above-described case, the photographing apparatus 200 may be provided with the automatic oscillation function and adjusted to photograph predetermined observation points in sequence. Subsequently, it becomes possible to record both the photographing images of the predetermined observation points and the environmental pollution level over time. For changing the observation point, the user only has to register a predetermined observation point with the photographing apparatus 200, since there is no need for the user to transmit an instruction to the information-acquisition apparatuses 1 to n. Therefore, the observation point can be easily changed and human error can be reduced.

Further, where a distance sensor for measuring a distance between the distance sensor and the water surface is used, as the sensing unit 112 of each of the information-acquisition apparatuses 1 to n, and where the information-acquisition apparatuses 1 to n are provided on a predetermined structure along a river (a bank, a bridge, and so forth), the information collection system of this embodiment can be used, as a system for monitoring a swelling river. That is to say, the number of errors occurring in this information collection system is smaller than in the case where mere conventional distance sensors are provided. This is because the photographing images are recorded concurrently with the predetermined information so that the user can visually check the photographing images in the case where a measurement error of the distance sensor is significant.

Second Embodiment

Figure 2:
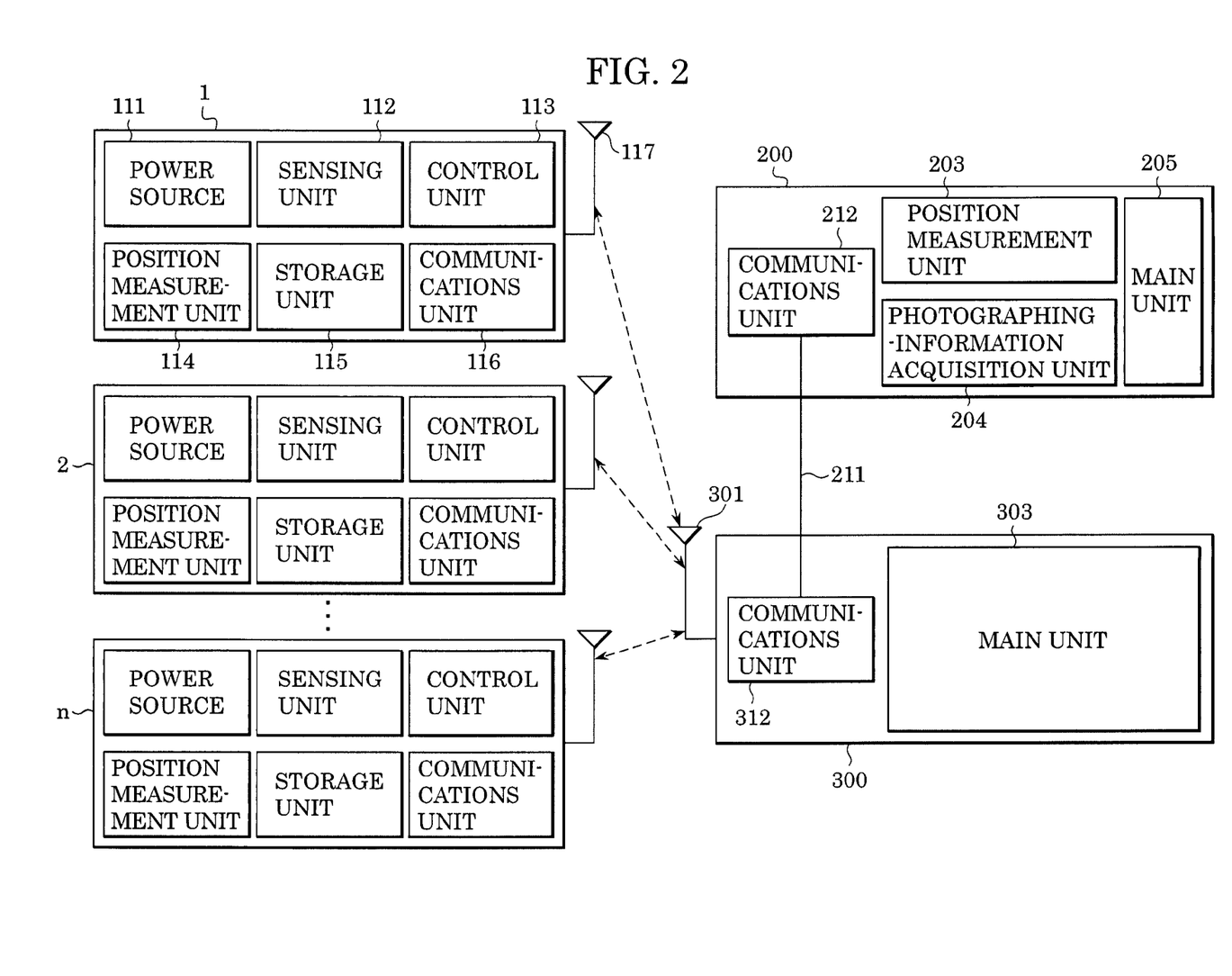
FIG. 2 is a block diagram of an information collection system according to a second embodiment of the present invention.

Next, an information collection system according to a second embodiment of the present invention will now be described with reference to FIG. 2. Since the configuration of the information-acquisition apparatuses 1, 2, . . . , n (where $n \geq 2$) shown in this drawing is the same as those of the first embodiment, the description thereof is omitted.

The photographing apparatus 200 of this embodiment is the same as that of the first embodiment except that a communications unit 212 is provided in place of the communications unit 202. The information collection apparatus 300 of this embodiment is the same as that of the first embodiment except that a communications unit 312 is provided in place of the communications unit 302.

The communications unit 212 is wire-connected to the communications unit 312 by a communications line 211. Otherwise, the photographing apparatus 200 may be integrated into the information collection apparatus 300 and the signal lines of the above-described apparatuses may be directly connected to each other (bus connection). In this case, the communications unit 212 and a control unit (not shown) of the photographing apparatus 200 can be eliminated and the photographing apparatus 200 is controlled by a control unit (not shown) of the information collection apparatus 300.

Since the communications unit 312 wire-communicates with the communications unit 212 and wireless-communicates with the information-acquisition apparatuses 1 to n at the same time, the communications unit 312 must have both the wire-communications function and the wireless-communications function. Since the other configuration of the communications unit 312 is the same as that of the communications unit 302 of the first embodiment, the description thereof is omitted here.

Third Embodiment

Figure 6:
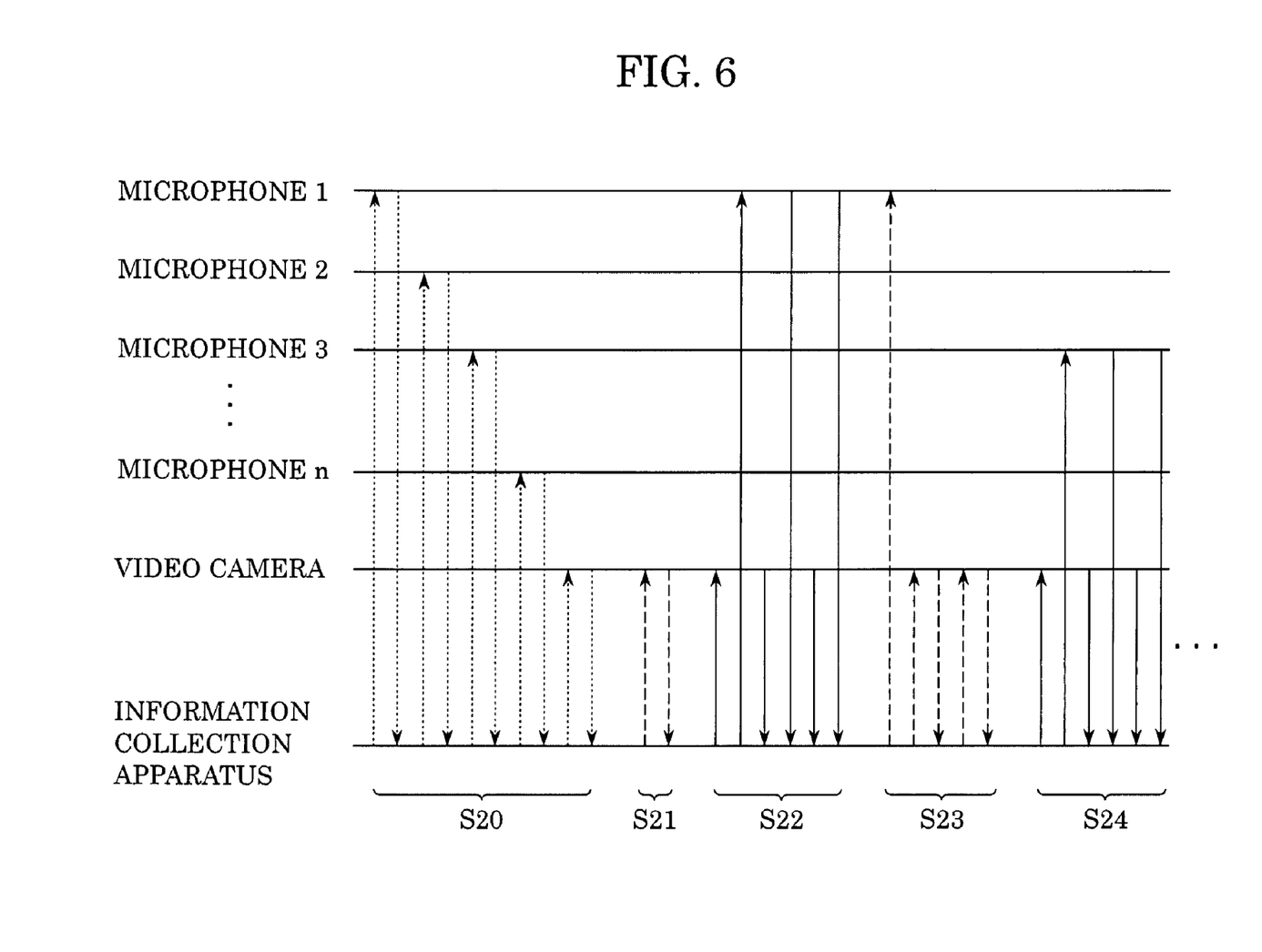
FIG. 6 is a sequence chart illustrating a second series of information-collection steps performed by the information collection apparatus according to either the first embodiment or the second embodiment.

An information collection system according to a third embodiment of the present invention will now be described. FIG. 6 is a sequence chart illustrating second procedural steps performed for collecting information by the information collection apparatus 300 according to the first embodiment or the second embodiment. In this drawing, the sequence flows from left to right.

In this drawing, the information-acquisition apparatuses 1 to n are customized into microphones 1 to n for obtaining continuous speech information. The photographing apparatus 200 is customized into a video camera 200 for obtaining continuous image information.

Procedural steps performed in sequence S20 are the same as those of sequence S10 shown in FIG. 5. That is to say, sequence S20 indicates procedural steps performed by the information collection apparatus 300 for collecting the position information from each of the microphones 1 to n and the video camera 200. It is to be noted that sequence S20 becomes unnecessary, where the position information was obtained in advance and stored in the information collection apparatus 300. In sequence S20, the information collection apparatus 300 requests the position information from the microphones 1 to n and the video camera 200 in sequence, and obtains the position information of each of the apparatuses by receiving an answer signal transmitted from each of the apparatuses.

Next, in sequence S21, the information collection apparatus 300 obtains photographing information (orientation θ, elevation angle φ, and focus distance r) transmitted from the video camera 200. The information collection apparatus 300 automatically selects the microphone 1 near the center of a photographing image by the selection method described with reference to FIG. 4.

Next, in sequence S22, the information collection apparatus 300 transmits an information-transmission request signal to both the video camera 200 and the microphone 1 at almost the same time. Upon receiving the information-transmission request signal, the video camera 200 and the microphone 1 continuously transmit photographing images and speech information to the information collection apparatus 300, respectively.

Here, the information collection apparatus 300 has an image display and presents the obtained images to the user. The user can remotely control the video camera 200 via the information collection apparatus 300. The user transmits an instruction to remotely control the video camera 200 to the information collection apparatus 300 between sequence S22 and sequence S23.

Next, in sequence S23, the information collection apparatus 300 transmits an information-stop request signal to the microphone 1 and transmits a remote-control signal to the video camera 200. After that, the video camera 200 continuously transmits photographing images and photographing information to the information collection apparatus 300. Where the user obtains the photographing image of a predetermined place while he/she remotely controls the video camera 200 and watches the obtained photographing images, the user issues an instruction to start photographing and recording for the predetermined place. Upon receiving the instruction transmitted from the user, the information collection apparatus 300 automatically selects the microphone 3 near the center of the photographing image according to the selection method described with reference to FIG. 4.

Next, in sequence S24, the same control operations as those in sequence S22 are performed. After that, the same control operations as those in sequences S23 and S22 are repeated.

Known video cameras are configured to obtain speech information only from a microphone connected thereto. Therefore, the known video camera can only record speech therearound during zoom in on a distant view under high magnification.

However, the information collection system of this embodiment can obtain speech information from the microphones 1 to n provided near the center (the focus point) of the photographing image. Accordingly, it becomes possible to match the details of the photographing image with those of the speech information at all times.

Fourth Embodiment

Figure 7:
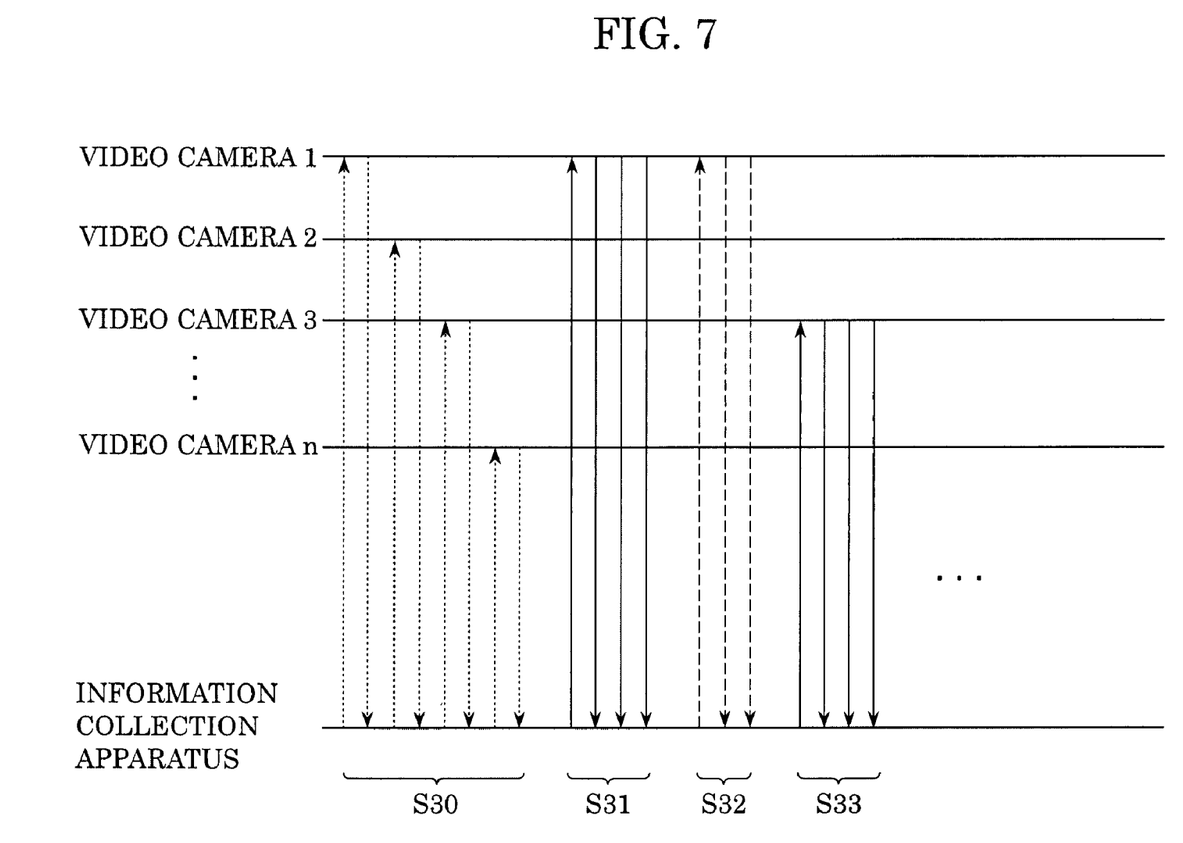
FIG. 7 is a sequence chart illustrating a third series of information-collection steps performed by the information collection apparatus according to either the first embodiment or the second embodiment.

An information collection system according to a fourth embodiment of the present invention will now be described. FIG. 7 is a sequence chart illustrating third procedural steps performed for collecting information by the information collection apparatus 300 according to the first embodiment or the second embodiment. In this drawing, the sequence flows from left to right.

In this drawing, the information-acquisition apparatuses 1 to n are customized into video cameras 1 to n for obtaining continuous image information. The photographing apparatus 200 is customized into the video camera 200 for obtaining the continuous image information. Here, the video camera 200 may have the same configuration as those of the video cameras 1 to n.

Therefore, since the video camera 1 serves as the video camera 200, the video camera 200 is not shown. Sequence S30 shows the same procedural steps as those in sequence S10 shown in FIG. 5. That is to say, sequence S30 illustrates procedural steps performed by the information collection apparatus 300 for obtaining the position information of each of the video cameras 1 to n.

However, in a case in which the position information of the video cameras 1 to n is obtained in advance and stored in the information collection apparatus 300, sequence S30 becomes unnecessary. In sequence S30, the information collection apparatus 300 requests position information from the video cameras 1 to n in sequence and obtains the position information of each of the apparatuses by receiving an answer signal transmitted from each of the apparatuses.

Next, in sequence S31, the information collection apparatus 300 transmits the information-transmission request signal to the video camera 1. Upon receiving the information-transmission request signal, the video camera 1 starts transmitting continuous photographing images (and speech information) to the information collection apparatus 300.

Here, the information collection apparatus 300 has an image display and presents the obtained images to the user. The user can remotely control the video cameras 1 to n via the information collection apparatus 300. The user transmits an instruction to remotely control the video camera 1 to the information collection apparatus 300 between sequence S31 and sequence S32.

Next, in sequence S32, the information collection apparatus 300 transmits a remote-control signal to the video camera 1. After that, the video camera 1 continuously transmits photographing images (and speech information) and the photographing information to the information collection apparatus 300. Where the user obtains the photographing image of a predetermined place while he/she remotely controls the video camera 1 and watches the obtained photographing images, the user issues an instruction to start photographing (and recording) for the predetermined place. Upon receiving the instruction transmitted from the user, the information collection apparatus 300 automatically selects the video camera 3 near the center of the photographing image according to the selection method described with reference to FIG. 4.

Next, in sequence S33, the same control operations as those in sequence S31 are performed. After that, the same control operations as those in sequences S32 and S31 are repeated.

Thus, the present invention allows for switching from one video camera to another so as to keep photographing by a video camera near the center portion of a photographing image at all times. Therefore, it becomes possible to switch from one video camera to another along the moving direction of a moving object, a person, and so forth, shown in the photographing image. This method is effective for a photographing system used for a TV and a motion picture, and a security system.

As has been described, according to the first to fourth embodiments of the present invention, it becomes possible to collect information about a predetermined place by selecting an information-acquisition apparatus nearest to the center portion of a photographing image from among a predetermined number of information-acquisition apparatuses and communicating only with the nearest information-acquisition apparatus, based on the position information of each of the information-acquisition apparatuses, the position information of the photographing apparatus, the photographing information indicating the photographing direction or the like of the photographing apparatus, and the image information obtained through photographing.

Further, since it becomes possible to select a predetermined information-acquisition apparatus from among the predetermined number of information-acquisition apparatuses and make the selected information-acquisition apparatus operate, the average operation time of the information-acquisition apparatuses is significantly reduced. Subsequently, the average power consumption of the information-acquisition apparatuses is greatly reduced. Since the above-described advantage allows for reducing the size of a battery mounted on each of the information-acquisition apparatuses, the information-acquisition apparatuses can also be downsized.

Further, since a wireless-communications device is used, as a communications device of each of the apparatuses including the information-acquisition apparatuses, and the information-acquisition apparatuses can be downsized, as described above, the degree of flexibility in selecting suitable places for providing the information-acquisition apparatuses becomes high. Subsequently, it becomes possible to provide the information-acquisition apparatuses at many places and in various circumstances.

Each of the information-acquisition apparatuses is sleeping in the initial state, so as to perform information-acquisition operations during a predetermined time interval or over a predetermined time period until the information collection apparatus transmits a sleep signal to the information-acquisition apparatus after receiving a wake-up signal from the information collection apparatus. Therefore, the measurement values are transmitted only to one or a small number of the information-acquisition apparatuses at the same time. Further, where multi-hop communications are performed between the information-acquisition apparatuses in operation, the amount of data passing each one of the information-acquisition apparatuses is prevented from being greatly increased. Subsequently, it becomes possible to transmit the measurement data at a predetermined data-transfer rate.

Further, since microphones are used, as the information-acquisition apparatuses, it becomes possible to obtain speech information from a microphone near a predetermined place photographed by the photographing apparatus. Subsequently, speech near a photographing subject can be obtained during the photographing apparatus photographs a predetermined place distant therefrom. Since it becomes possible to record speech information in synchronization with the photographing image of the photographing subject, the details of image information of the photographing subject can be matched with those of the speech information for video recording.

Further, by using first and second photographing apparatuses, as the information-acquisition apparatuses, it becomes possible to obtain a photographing image from the second photographing apparatus provided at a predetermined place photographed by the first photographing apparatus. That is to say, the role of the second photographing apparatus can be switched to that of the first photographing apparatus. Therefore, it becomes possible to automatically switch between the first and second photographing apparatuses by the photographing apparatuses.

Other Embodiments

It is to be understood that the present invention can also be achieved by supplying program code of software for implementing the functions of the above-described embodiments to a computer (a CPU or an MPU) provided in an apparatus or a system connected to the above-described apparatuses, so as to make the apparatuses operate for achieving the functions of the above-described embodiments, and making the above-described apparatuses operate according to a program stored in the computer of the system or the apparatus.

In that case, the program code itself of the software achieves the functions of the above-described embodiments, and thus the program code itself and a unit for supplying the program code to the computer, for example, a recording medium storing the program code constitute the present invention. The storage medium for providing the program code may be, for example, a flexible disk, a hard disk, an optical disk, a magneto-optical disk, a CD-ROM, a magnetic tape, a non-volatile memory card, a ROM, etc.

Furthermore, in addition to the case where the functions of the above-described embodiments are achieved by the computer executing the supplied program code, there is a case where the functions of the above-described embodiments are achieved by using the program code with an operating system (OS) and/or other application software or the like running on the computer. The latter is also one of the embodiments of the present invention.

In another embodiment of the present invention, the supplied program code may be written into a memory of a function extension board inserted in the computer or a function extension unit connected to the computer. Then, the functions of the above-described embodiments may be realized by executing unit of or the entire process by a CPU, or the like of the function extension board or the function extension unit based on instructions of the program code.

While the present invention has been described with reference to what are presently considered to be the embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An information collection system comprising:

an information collection apparatus;

a plurality of information acquisition apparatuses equipped with communication means; and a photographing apparatus equipped with communication means, wherein the information collection apparatus includes first information collecting means, information-acquisition-apparatus selecting means, and second information collecting means, the first information collecting means being configured to collect, via the communication means, position information of the information acquisition apparatuses, position information of the photographing apparatus, photographing information including a photographing direction of the photographing apparatus, and image information obtained as a result of a photographing operation, the information-acquisition-apparatus selecting means being configured to select the information acquisition apparatus located closest to a center of a photographic image on the basis of the information obtained by the first information collecting means, the second information collecting means being configured to communicate with the information acquisition apparatus selected by the information-acquisition-apparatus selecting means so as to collect information about a specific position, wherein each information acquisition apparatus has a control unit, a communication unit, and a sensor that does not operate in a sleep mode and each information acquisition apparatus is in a sleep mode in an initial state thereof, wherein the information acquisition apparatus performs an information acquisition operation only for a predetermined time period or until receiving a sleep signal from the information collection apparatus in a wake-up mode after the information acquisition apparatus receives a wake-up signal from the information collection apparatus in the sleep mode, and wherein, in the wake-up mode, the power for the information acquisition apparatus is distributed to all units of the information acquisition apparatus, and, in the sleep-mode, the power is not distributed to all but only the control unit and the communication unit.

2. An information collection system according to claim 1, wherein if one of or each of the photographing apparatus and the plurality of information acquisition apparatuses is preliminarily disposed at a predetermined position, the position information thereof is set to a default value, the information collection apparatus in that case preliminarily storing the default value of the position information in a storage medium so that the first information collecting means collects, via the communication means, only the photographing information including the photographing direction and the image information obtained as a result of the photographing operation.

3. An information collection system according to claim 1, wherein one of or each of the photographing apparatus and the plurality of information acquisition apparatuses is equipped with position detecting means configured to detect its own position, the position information detected by the position detecting means being sent to the information collection apparatus via the communication means.

4. An information collection system according to claim 1, wherein the information collection apparatus includes information storing means configured to store the image information obtained by the first information collecting means and the information about the specific position obtained by the second information collecting means in correlation with each other.

5. An information collection system according to claim 1, wherein the communication means included in the information collection apparatus, the information acquisition apparatuses, and the photographing apparatus partly or entirely comprise radio communication means.

6. An information collection system according to claim 5, wherein the radio communication means employs an electromagnetic wave.

7. An information collection system according to claim 1, wherein the photographing apparatus and the information collection apparatus are integrated with each other.

8. An information collection system according to claim 1, wherein each of the information acquisition apparatuses is equipped with a battery as a power source.

9. An information collection system according to claim 1, wherein the sensor of each of the information acquisition apparatuses has a sensing function for acquiring physical, chemical, or biochemical information.

10. An information collection system according to claim 1, wherein the sensor of each of the information acquisition apparatuses has a microphone for acquiring sound information.

11. An information collection system according to claim 1, wherein the information acquisition apparatuses each comprise a second photographing apparatus separate from the photographing apparatus.

* * * * *